Patented Sept. 14, 1937

2,093,355

UNITED STATES PATENT OFFICE 2,093,355

CARBAZOLES OF ANTHRAQUINONE AND PROCESS OF PRODUCING THEM

Ernst Gutzwiller, Basel, Switzerland, assignor to Chemical Works Formerly Sandoz, Basel, Switzerland No Drawing. Application March 10, 1933, Serial No. 660,332. In Switzerland March 12, 1932

8 Claims. (Cl. 260—46)

This invention relates to new water soluble dyestuffs of the anthraquinone series and it comprises the manufacture thereof as well as the products themselves.

It is known that benzcarbazoles of the anthraquinone series may be prepared by treating with oxidizing agents such alpha-arylaminoanthraquinones that contain in the arylaminoradical a substituent in the p-position and an acylated aminogroup in an alpha-position of the anthraquinone radical (see German specification 288,824).

Now it has been found that new sulphonated and easily water soluble naphthcarbazoles of the anthraquinone series can be prepared by treating with sulphonating agents anthraquinone derivatives that contain in an alpha-position a substituted or unsubstituted beta-naphthylamine radical and that possess at least one acylamine group in an alpha-position of the anthraquinone nucleus. During this treatment simultaneously the formation of the carbazole derivatives and the sulphonation of the products in the naphthalene radical occurs. Sometimes it is sufficient to dissolve the starting products in the sulphonating agents in order to perform this reaction.

The new compounds produced in this manner are very valuable dyestuffs of excellent fastness properties. They dye from acid or neutral bath nearly all textile fibres like wool, silk, (weighted and unweighted), tussah silk, cotton, artificial silks from regenerated cellulose and also leather They give on these fibres pure brown shades of excellent fastness.

In comparison with the process described in the German specification No. 288,824 the improved process possesses several important advantages. By working as set forth below it is possible to prepare the above described dyestuffs in a single operation and therefore to avoid the oxidative treatment of the intermediate products produced by the known methods.

One object of the invention is therefore to provide a new process for the manufacture of water soluble dyestuffs derived from anthraquinone derivatives of the general formula:

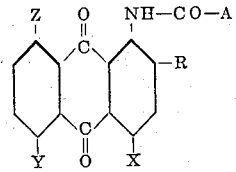

wherein A represents methyl or phenyl, which phenyl may be substituted in its nucleus with a nitro or amino group, R represents hydrogen, halogen, alkoxy, methyl or sulpho, X represents hydrogen or beta-naphthylamine, Y represents hydrogen, chlorine or beta-naphthylamine, Z represents hydrogen or beta-naphthylamine, but either X, Y or Z must be a beta-naphthylamino group.

The term "acylamino group" embraces amino groups linked to an aliphatic or an aromatic carboxylic acid, typical examples being acetylamino, benzoylamino, or a substituted benzoylamino like nitrobenzoylamino, aminobenzoylamino groups.

Another object of the invention is to provide a new process for the manufacture of water soluble dyestuffs consisting in treating the above said anthraquinone compounds with sulphonating agents.

The term "sulphonating agents" embraces aqueous sulphuric acid, monohydrate, oleum of various concentrations and mixtures of sulphuric acid and chlorosulphonic acid.

Still another object of the invention is to provide new methods for the treatment of the above said anthraquinone derivatives with sulphonating agents, the treatment being characterized in that it can be carried out at a temperature higher than 0° C. and, if desired, in presence of organic solvents. By appropriate selection of the sulphonating agents and of the temperature the preparation of the new dyestuffs can be carried out in a very short time.

The relative proportions of the ingredients may be varied within wide limits, but it is preferable to use at least a small excess of the sulphonating agent.

Still another object of the invention is to provide new sulphonated naphthcarbazoles of the anthraquinone series, that represent very valuable products and possess probably the general formula

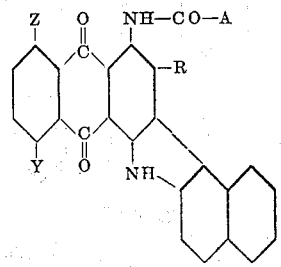

wherein A represents a phenyl, which may be substituted in its nucleus with a nitro or amino group and R represents hydrogen, halogen, alkoxy, methyl or sulpho, Z represents hydrogen or beta-naphthylamine and Y represents hydrogen or chlorine and wherein the naphthalene radical contains at least one sulphonic group, but may contain further substituents such as alkyl or halogen groups.

Still another object of the invention is to provide new water-soluble dyestuffs of the naphth-carbazole-anthraquinone series, which possess excellent properties of fastness and dye textile fibres and leather very fast brown shades.

The following examples, without being limitative, illustrate the present process, the parts being by weight.

Example 1

10 parts of 1-benzoylamino-2-methyl-4-beta-naphthylaminoanthraquinone are introduced under stirring and at a temperature of 18–20° C. into 30–40 parts of sulphuric acid of 98%. The mass obtained is stirred at this temperature until a test shows that it became completely soluble in water, this occurring after one to two hours. By heating the reaction mass up to 30–40° C. or by adding thereto a small quantity of oleum, the sulphonation can be carried out more rapidly. The produced dyestuff is isolated by pouring the reaction mixture into water or on ice whereby it precipitates and can easily be separated. It dyes wool beautiful red-brown shades that possess excellent properties of fastness. It dyes further from neutral or acid bath leather, cotton, weighted and unweighted silk, tussah, copperammonium silk and nitro silk. It possesses the following probable formula

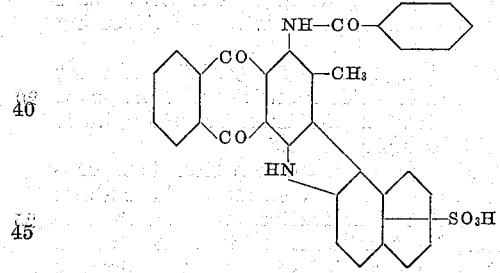

Example 2

5 parts of 1-benzoylamino-4-beta-napthyl-aminoanthraquinone are introduced at about 20° C. into 25 parts of sulphuric acid monohydrate and stirred until the mass becomes watersoluble, this occurring after some hours. The dyestuff isolated in the manner described in Example 1, dyes wool reddish brown shades. It possesses the following probable formula

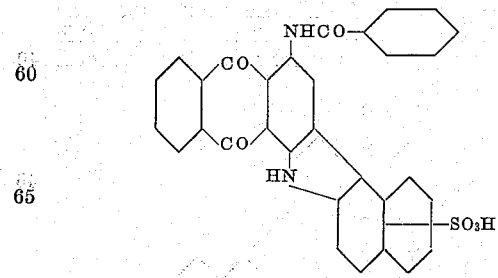

Example 3

5 parts of 1-benzoylamino-2-bromo-4-beta-naphthylaminoanthraquinone are dissolved in 40 parts of oleum (containing 5% $SO_3$) and heated under stirring at 40° C. until the reaction product becomes soluble in water. The obtained dyestuff is then isolated from the reaction mass in the above described manner. It dyes wool brown shades. It possesses the following probable formula

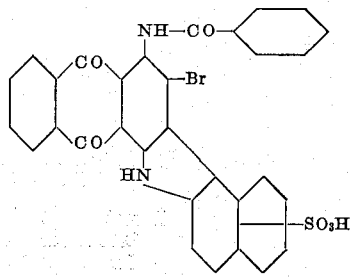

By treating the dyestuff thus obtained with sulphite it becomes possible to replace the bromine-atom in 2-position by a sulphonic acid group and to obtain a new dyestuff dyeing wool brown shades. This dyestuff possesses the following probable formula:

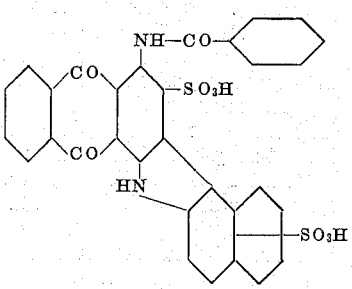

Example 4

1 part of 1-acetylamino-2-methyl-4-beta-naphthylaminoanthraquinone is dissolved at 20° C. in 5 parts of sulphuric acid monohydrate and stirred at this temperature for about one hour. The isolated dyestuff dyes wool grey-brown shades. It possesses the following probable formula:

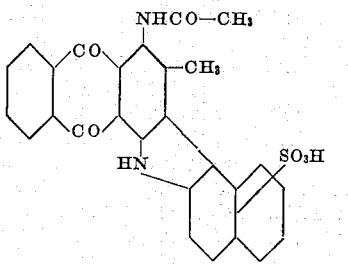

The products prepared according to the examples possess the following properties:

| Examples | Color of powder | Sol. in aq. | Sol. in $H_2SO_4$ | Sol. in $H_2SO_4+H_2CO$ |
|---|---|---|---|---|
| Ex. 1 | Brown | Yellow-brown | Blue | Green |
| Ex. 2 | Black-brown | Red-brown | Green | Green |
| Ex. 3 | Dark-brown | Yellow-brown | Blue-green | Blue-green |
| Ex. 4 | Black-brown | Red-brown | Blue | Blue-green |

Instead of the compounds used in the above examples it is obviously possible to use any other compounds that may respond to the given general formulae, typical examples being 1.5- or 1.8-benzoylamino - beta - naphthylaminoanthraquinone, 1-acetylamino-4-beta-naphthylaminoanthraquinone, 1-benzolylamino-2-bromo-4-beta-naphthylamino-5-chloro-anthraquinone, 1.8-dibenzoylamino-4-beta-naphthylaminoanthraquinone, 1-benzoylamino-2-alkoxy-4-beta-naphthylaminoanthraquinone, 1-benzoylamino-2-sulpho-4-beta-naphthylaminoanthraquinone, 1-nitrobenzoylamino-4-beta-naphthylaminoanthraquinone etc.

What I claim is:

1. A process for the manufacture of water soluble dyestuffs of the anthraquinone series, comprising treating anthraquinone derivatives of the general formula

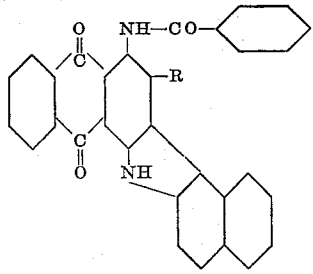

wherein R represents a monovalent substituent selected from the class consisting of hydrogen, bromine and methyl, with concentrated sulphuric acid at 18–40° C.

2. A process for the manufacture of a water-soluble dyestuff, comprising treating 1-benzoylamino-4-beta-naphthylaminoanthraquinone with concentrated sulphuric acid at 20° C.

3. A process for the manufacture of a water-soluble dyestuff, comprising treating 1-benzoylamino-2-methyl-4-beta-naphthylaminoanthraquinone with concentrated sulphuric acid at 40° C.

4. A process for the manufacture of a water-soluble dyestuff, comprising treating 1-benzoylamino-2-bromo-4-beta-naphthylaminoanthraquinone with sulphuric acid.

5. The water-soluble dyestuffs of the anthraquinone series, possessing the general formula

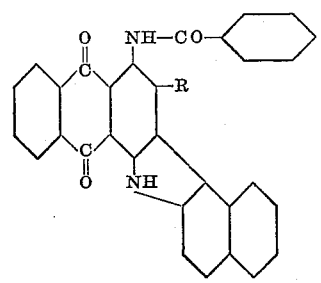

wherein R represents a monovalent substituent selected from the group hydrogen, bromine and methyl and wherein the naphthalene radical contains at least one sulphonic group, which dyestuffs are in dry state brown to black-brown powders easily soluble in water yielding a yellow-brown to red-brown solution, said dyestuffs being soluble in concentrated sulphuric acid yielding a green to blue, and in presence of formaldehyde, a green to blue green solution and dyeing wool, cotton, natural weighted and unweighted silk, tussah silk, leather and artificial silks from regenerated cellulose brown shades of excellent fastness.

6. The water-soluble dyestuff of the formula:

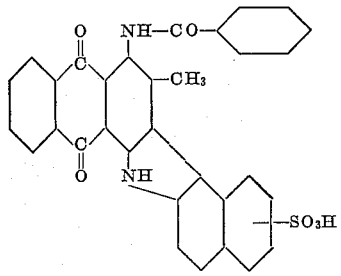

which is in dry state a brown powder soluble in water to yellow brown, in concentrated sulphuric acid to a blue and in presence of formaldehyde to a gree solution, which dyes wool, cotton, natural weighted and unweighted silk, tussah silk, leather and artificial silks from regenerated cellulose pure brown shades of excellent fastness.

7. The water-soluble dyestuff of the formula:

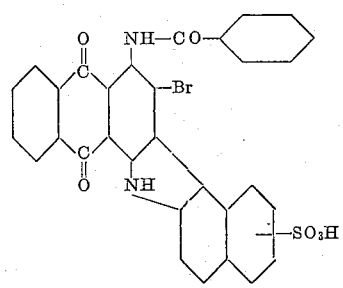

which is in dry state a dark brown powder, easily soluble in water to a yellow-brown, in concentrated sulphuric acid to a blue-green and in presence of formaldehyde to a blue-green solution which dyes wool, cotton, natural weighted and unweighted silk, tussah silk, leather and artificial silks from regenerated cellulose brown shades of excellent fastness.

8. The water-soluble dyestuff of the formula

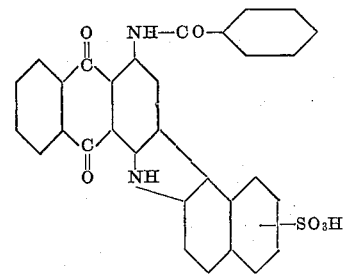

which is in the dry state a brown powder, soluble in water to yellow brown, in concentrated sulphuric acid to blue and in presence of formaldehyde to a green solution, which dyes wool, cotton, natural weighted and unweighted silk, tussah silk, leather and artificial silks from regenerated cellulose reddish-brown shades of excellent fastness.

ERNST GUTZWILLER.